(12) United States Patent
Romem et al.

(10) Patent No.: US 10,979,503 B2
(45) Date of Patent: Apr. 13, 2021

(54) SYSTEM AND METHOD FOR IMPROVED STORAGE ACCESS IN MULTI CORE SYSTEM

(71) Applicant: Excelero Storage Ltd., Tel Aviv (IL)

(72) Inventors: Yaniv Romem, Jerusalem (IL); Omri Mann, Jerusalem (IL); Ofer Oshri, Kfar Saba (IL); Kirill Shoikhet, Raanana (IL)

(73) Assignee: Excelero Storage Ltd., Tel Aviv (IL)

( * ) Notice: Subject to any disclaimer, the term of this patent is extended or adjusted under 35 U.S.C. 154(b) by 43 days.

(21) Appl. No.: 16/371,869

(22) Filed: Apr. 1, 2019

(65) Prior Publication Data

US 2019/0230161 A1 Jul. 25, 2019

Related U.S. Application Data

(63) Continuation-in-part of application No. 16/282,629, filed on Feb. 22, 2019, now Pat. No. 10,673,947, and
(Continued)

(51) Int. Cl.
*H04L 29/08* (2006.01)
*G06F 16/30* (2019.01)
(Continued)

(52) U.S. Cl.
CPC .......... *H04L 67/1097* (2013.01); *G06F 3/061* (2013.01); *G06F 3/067* (2013.01);
(Continued)

(58) Field of Classification Search
CPC ..... H04L 67/1097; G06F 16/30; G06F 16/00; G06F 3/061; G06F 3/0665; G06F 3/067;
(Continued)

(56) References Cited

U.S. PATENT DOCUMENTS 5,309,451 A 5/1994 Noya et al.
5,717,691 A 2/1998 Dighe et al.
(Continued)

OTHER PUBLICATIONS

Sathiamoorthy, et al., "XORing Elephants: Novel Erasure Codes for Big Data", Proceedings of the VLDB Endowment, vol. 6, No. 5, 2013, pp. 325-336.

*Primary Examiner* — Philip J Chea
*Assistant Examiner* — Hassan A Khan
(74) *Attorney, Agent, or Firm* — M&B IP Analysts, LLC

(57) ABSTRACT

A system and method for improving multi-core processor access to storages, the method including: assigning a unique memory space within a memory to each of a plurality of processor cores; initiating a shared queue pair (QP), comprising a shared send queue and a shared receive queue, between the plurality of processor cores and at least a storage, wherein the shared queue is accessible by the plurality of processor cores; sending an instruction on the shared send queue from a first core of the plurality of processor cores to the storage, the instruction comprising an interrupt destination on a memory space assigned to the first core; and receiving an interrupt at the interrupt destination from the storage in response to the instruction, wherein the interrupt is generated for the first core.

19 Claims, 3 Drawing Sheets

Related U.S. Application Data a continuation-in-part of application No. 16/270,239, filed on Feb. 7, 2019, which is a continuation-in-part of application No. 15/975,379, filed on May 9, 2018, now Pat. No. 10,788,992, and a continuation-in-part of application No. 15/684,439, filed on Aug. 23, 2017, now Pat. No. 10,565,054, and a continuation of application No. 14/934,830, filed on Nov. 6, 2015, now Pat. No. 10,237,347, which is a continuation-in-part of application No. 14/934,830, and a continuation of application No. 14/726,919, filed on Jun. 1, 2015, now Pat. No. 9,971,519.

(60) Provisional application No. 62/658,068, filed on Apr. 16, 2018, provisional application No. 62/629,825, filed on Feb. 13, 2018, provisional application No. 62/381,011, filed on Aug. 29, 2016, provisional application No. 62/172,265, filed on Jun. 8, 2015, provisional application No. 62/126,920, filed on Mar. 2, 2015, provisional application No. 62/119,412, filed on Feb. 23, 2015, provisional application No. 62/096,908, filed on Dec. 26, 2014, provisional application No. 62/085,568, filed on Nov. 30, 2014, provisional application No. 62/030,700, filed on Jul. 30, 2014.

(51) Int. Cl.
  *G06F 16/00* (2019.01)
  *G06F 3/06* (2006.01)
  *G06F 12/109* (2016.01)

(52) U.S. Cl.
  CPC .......... *G06F 3/0665* (2013.01); *G06F 12/109* (2013.01); *G06F 16/00* (2019.01); *G06F 16/30* (2019.01); *G06F 2212/1024* (2013.01); *G06F 2212/154* (2013.01); *G06F 2212/163* (2013.01); *G06F 2212/657* (2013.01)

(58) Field of Classification Search
  CPC .......... G06F 12/109; G06F 2212/1024; G06F 2212/154; G06F 2212/163; G06F 2212/657
  See application file for complete search history.

(56) References Cited

U.S. PATENT DOCUMENTS

| | | |
|---|---|---|
| 5,745,671 A | 4/1998 | Hodges |
| 5,805,788 A | 9/1998 | Johnson |
| 5,889,934 A | 3/1999 | Peterson |
| 6,108,812 A | 8/2000 | Born |
| 6,839,803 B1 | 1/2005 | Loh et al. |
| 7,515,612 B1 | 4/2009 | Thompson |
| 7,539,780 B2 | 5/2009 | Makhervaks et al. |
| 7,577,667 B2 | 8/2009 | Hinshaw et al. |
| 7,590,768 B2 | 9/2009 | Gormley |
| 7,710,968 B2 | 5/2010 | Cornett et al. |
| 7,953,915 B2 | 5/2011 | Ge et al. |
| 8,037,154 B2 | 10/2011 | Biran et al. |
| 8,103,785 B2 | 1/2012 | Crowley et al. |
| 8,122,155 B1 | 2/2012 | Marti |
| 8,233,380 B2 | 7/2012 | Subramanian et al. |
| 8,244,986 B2 | 8/2012 | Solihin |
| 8,265,095 B2 | 9/2012 | Fritz et al. |
| 8,307,271 B1 | 11/2012 | Liu et al. |
| 8,407,448 B1 | 3/2013 | Hayden et al. |
| 8,433,848 B1 | 4/2013 | Naamad et al. |
| 8,706,962 B2 | 4/2014 | Belluomini et al. |
| 8,775,718 B2 | 7/2014 | Kanevsky et al. |
| 8,832,216 B2 | 9/2014 | Bugge |
| 8,910,031 B1 | 12/2014 | Liu et al. |
| 9,241,044 B2 | 1/2016 | Shribman et al. |
| 9,462,308 B2 | 10/2016 | LaBosco et al. |
| 9,467,511 B2 | 10/2016 | Tamir et al. |
| 9,467,512 B2 | 10/2016 | Tamir et al. |
| 9,529,773 B2 | 12/2016 | Hussain et al. |
| 9,639,457 B1 | 5/2017 | Piszczek et al. |
| 2005/0038850 A1 | 2/2005 | Oe et al. |
| 2005/0129039 A1* | 6/2005 | Biran ................ H04L 45/00 370/412 |
| 2006/0059408 A1 | 3/2006 | Chikusa et al. |
| 2006/0230219 A1* | 10/2006 | Njoku ................ G06F 13/4022 710/316 |
| 2006/0235999 A1 | 10/2006 | Shah et al. |
| 2008/0109616 A1 | 5/2008 | Taylor |
| 2008/0126509 A1* | 5/2008 | Subramanian ........ H04L 49/90 709/214 |
| 2008/0181245 A1* | 7/2008 | Basso ................ H04L 47/50 370/412 |
| 2009/0300023 A1 | 12/2009 | Vaghani |
| 2010/0083247 A1 | 4/2010 | Kanevsky et al. |
| 2011/0131377 A1* | 6/2011 | Gray ................ G06F 12/084 711/122 |
| 2012/0079143 A1 | 3/2012 | Krishnamurthi et al. |
| 2012/0144233 A1 | 6/2012 | Griffith et al. |
| 2012/0300633 A1* | 11/2012 | Friedman ............ H04L 49/9073 370/235 |
| 2013/0019032 A1* | 1/2013 | Han ................ G06F 13/24 710/22 |
| 2013/0054726 A1* | 2/2013 | Bugge ................ G06F 9/52 709/212 |
| 2013/0073821 A1 | 3/2013 | Flynn et al. |
| 2013/0198311 A1 | 8/2013 | Tamir et al. |
| 2013/0198312 A1* | 8/2013 | Tamir ................ G06F 21/44 709/212 |
| 2013/0254321 A1* | 9/2013 | Johnsen ............ G06F 15/17331 709/212 |
| 2013/0262614 A1* | 10/2013 | Makhervaks ............ G06F 5/14 709/212 |
| 2014/0089444 A1 | 3/2014 | Makhervaks et al. |
| 2014/0211808 A1* | 7/2014 | Koren ................ H04L 41/00 370/401 |
| 2014/0297982 A1 | 10/2014 | Duzett |
| 2014/0317336 A1* | 10/2014 | Fitch ................ G06F 12/1036 711/103 |
| 2015/0006663 A1 | 1/2015 | Huang |
| 2015/0026286 A1 | 1/2015 | Sharp et al. |
| 2015/0030034 A1* | 1/2015 | Bogdanski ............ H04L 45/24 370/401 |
| 2015/0089121 A1 | 3/2015 | Coudhury et al. |
| 2015/0319237 A1* | 11/2015 | Hussain ................ G06F 3/061 709/217 |
| 2016/0034418 A1 | 2/2016 | Romem et al. |
| 2016/0036913 A1 | 2/2016 | Romem et al. |
| 2016/0057224 A1 | 2/2016 | Ori |
| 2016/0253267 A1 | 9/2016 | Wood et al. |
| 2016/0266965 A1 | 9/2016 | B et al. |
| 2016/0371226 A1* | 12/2016 | Shalf ................ G06F 12/1081 |
| 2017/0093792 A1* | 3/2017 | Marom ................ H04L 61/2514 |
| 2017/0134269 A1* | 5/2017 | Bogdanski ............ H04L 49/70 |
| 2017/0187496 A1* | 6/2017 | Shalev ................ H04L 69/324 |
| 2017/0289036 A1* | 10/2017 | Vasudevan ............ H04L 49/70 |
| 2018/0293188 A1* | 10/2018 | Katayama ............ G06F 13/1663 |

* cited by examiner

SYSTEM AND METHOD FOR IMPROVED STORAGE ACCESS IN MULTI CORE SYSTEM

CROSS-REFERENCE TO RELATED APPLICATIONS

This application claims the benefit of U.S. Provisional Application No. 62/658,068 filed on Apr. 16, 2018. This application is a continuation-in-part (CIP) of:
(a) U.S. patent application Ser. No. 16/282,629 filed on Feb. 22, 2019, which is a continuation of U.S. patent application Ser. No. 14/934,830 filed on Nov. 6, 2015, now U.S. Pat. No. 10,237,347, which claims the benefit of U.S. Provisional Application No. 62/172,265 filed on Jun. 8, 2015; and
(b) U.S. patent application Ser. No. 16/270,239 filed on Feb. 7, 2019, which claims the benefit of U.S. Provisional Application No. 62/629,825 filed on Feb. 13, 2018. The Ser. No. 16/270,239 application is a CIP of:
  (i) U.S. patent application Ser. No. 15/975,379 filed on May 9, 2018, which is a continuation of U.S. patent application Ser. No. 14/726,919 filed on Jun. 1, 2015, now U.S. Pat. No. 9,971,519, which claims benefit of U.S. Provisional Application No. 62/126,920 filed on Mar. 2, 2015, U.S. Provisional Application No. 62/119,412 filed on Feb. 23, 2015, U.S. Provisional Application No. 62/096,908 filed on Dec. 26, 2014, U.S. Provisional Application No. 62/085,568 filed on Nov. 30, 2014, and U.S. Provisional Application No. 62/030,700 filed Jul. 30, 2014;
  (ii) U.S. patent application Ser. No. 15/684,439 filed Aug. 23, 2017 which claims benefit of 62/381,011 filed on Aug. 29, 2016; and
  (iii) the aforementioned U.S. patent application Ser. No. 14/934,830.
All of the applications referenced above are herein incorporated by reference.

TECHNICAL FIELD

The present disclosure relates generally to storage access and particularly to multi-core client devices accessing local and remote storage devices.

BACKGROUND

Typically, in client devices having multi-core processors, each core generates requests and receives responses, or interrupts. These requests and interrupts can be local or remote. Multiple send-receive queue pairs and completion queues are generated between each core and each of potentially many storage devices to which the client connects. While this overhead may not present a problem for local storage, network resources are usually more limited when applied remotely, and reducing use of resources is advantageous in many cases.

It would therefore be advantageous to provide a solution to allow multi-core client devices to access local and remote storage devices while utilizing less resources.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for improving multi-core processor access to storages, the method including: assigning a unique memory space within a memory to each of a plurality of processor cores; initiating a shared queue pair (QP), comprising a shared send queue and a shared receive queue, between the plurality of processor cores and at least a storage, wherein the shared queue is accessible by the plurality of processor cores; sending an instruction on the shared send queue from a first core of the plurality of processor cores to the storage, the instruction comprising an interrupt destination on a memory space assigned to the first core; and receiving an interrupt at the interrupt destination from the storage in response to the instruction, wherein the interrupt is generated for the first core.

Certain embodiments disclosed herein also include a non-transitory computer readable medium having stored thereon instructions for causing a processing circuitry to perform a process, the process including: assigning a unique memory space within a memory to each of a plurality of processor cores; initiating a shared queue pair (QP), comprising a shared send queue and a shared receive queue, between the plurality of processor cores and at least a storage, wherein the shared queue is accessible by the plurality of processor cores; sending an instruction on the shared send queue from a first core of the plurality of processor cores to the storage, the instruction comprising an interrupt destination on a memory space assigned to the first core; and receiving an interrupt at the interrupt destination from the storage in response to the instruction, wherein the interrupt is generated for the first core.

Certain embodiments disclosed herein also include a system for improving multi-core processor access to storages, including: a processing circuitry; and a memory, the memory containing instructions that, when executed by the processing circuitry, configure the system to: assign a unique memory space within a memory to each of a plurality of processor cores; initiate a shared queue pair (QP), comprising a shared send queue and a shared receive queue, between the plurality of processor cores and at least a storage, wherein the shared queue is accessible by the plurality of processor cores; send an instruction on the shared send queue from a first core of the plurality of processor cores to the storage, the instruction comprising an interrupt destination on a memory space assigned to the first core; and receive an interrupt at the interrupt destination from the storage in response to the instruction, wherein the interrupt is generated for the first core.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
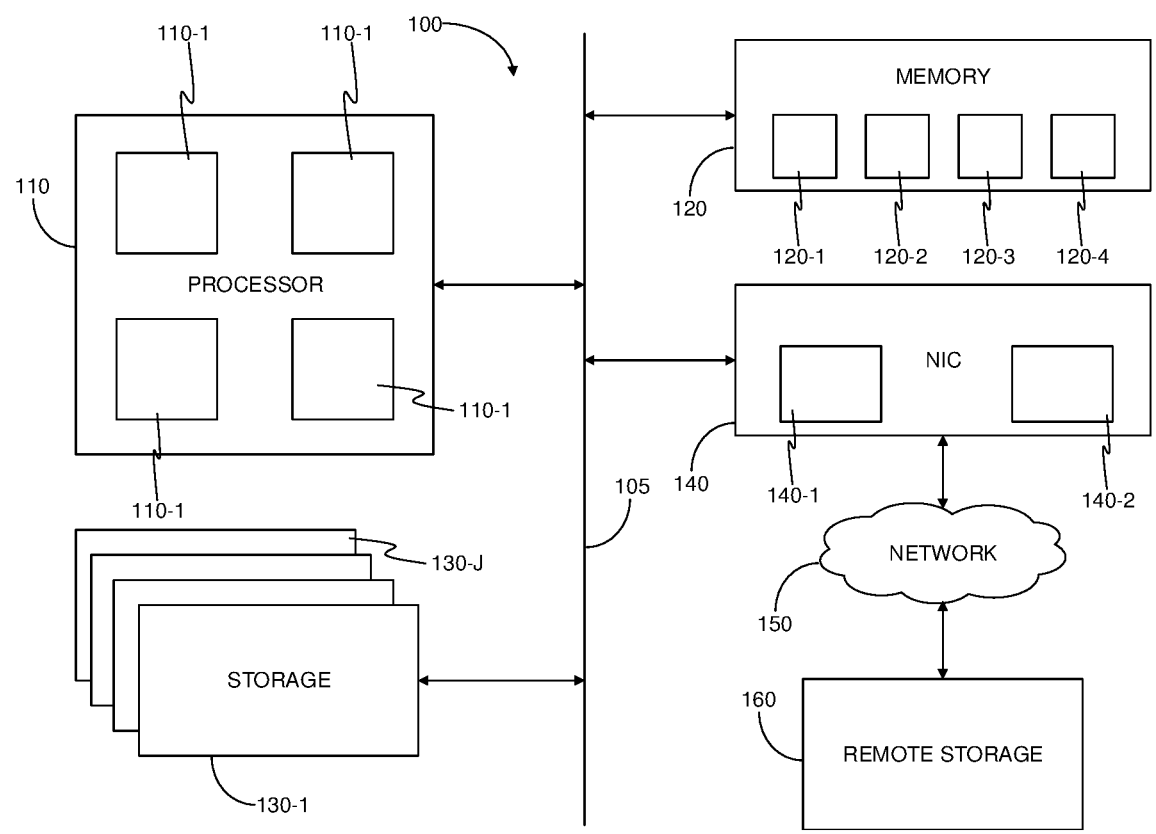
FIG. 1 is a schematic illustration of a multi-core client device accessing local and remote storage devices according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system with a multi-core processor is disclosed, which accesses a network accessible storage device. Each core is associated with a unique memory space. A core sends an instruction on a shared outgoing queue between the cores and the storage device, where the instruction includs an interrupt destination on the memory space assigned to the core. The shared queue is accessible by two or more of the cores. A write is received at the interrupt destination from the storage device, in response to executing the instruction. The write at the interrupt destination causes an interrupt to be generated for the core which sent the instruction to the storage device. By sharing a queue between a plurality of cores, computational overhead and network bandwidth can be reduced.

FIG. 1 is a schematic illustration of a multi-core client device 100 accessing local and remote storage devices according to an embodiment. The client 100 includes at least one processing circuitry (or processor) 110, for example, a central processing unit (CPU). In an embodiment, the processor 110 includes a plurality of cores 110-1 through 110-4. The processing circuitry 110 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 110 is coupled via a bus 105 to a memory 120. The memory 120 includes a plurality of memory portions 120-1 through 120-4, each corresponding to a core of the plurality of cores (e.g., memory portion 120-1 corresponds to core 110-1, and the like). In certain embodiments, the memory 120 may include a memory portion that contains instructions that, when executed by the processing circuitry 110, performs the method described in more detail herein. The memory 120 may be further used as a working scratch pad for the processing circuitry 110, a temporary storage, and others, as the case may be. The memory 120 may be a volatile memory such as, but not limited to random access memory (RAM), or non-volatile memory (NVM), such as, but not limited to, flash memory.

The processing circuitry 110 may be further coupled to a plurality of local storage devices 130-1 through 130-J, where 'J' is an integer equal to or greater than 1. In some embodiments, the client device 100 may not include a local storage device. A local storage device 130 may be, for example, a solid state disk (SSD), a magnetic hard drive disk (HDD), and the like.

The processing circuitry 110 may be further coupled with a network interface controller (NIC) 140. The NIC 140 is configured to provide access to remote storage devices through a network 150. In an embodiment, the network 150 is configured to provide connectivity of various sorts, as may be necessary, including but not limited to, wired or wireless connectivity, including, for example, local area network (LAN), wide area network (WAN), metro area network (MAN), worldwide web (WWW), Internet, and any combination thereof, as well as cellular connectivity. In certain embodiments, the NIC 140 includes a NIC processor 140-1 and a NIC memory 140-2. An NIC having an onboard processor to offload from the CPU cores of the client device is discussed in more detail for example in U.S. Non-Provisional patent application Ser. No. 14/934,830 and U.S. Provisional Patent Application 62/629,825, assigned to the common assignee and is hereby incorporated by reference.

The network 150 may provide connectivity with one or more remote storages devices, such as remote storage 160. A remote storage 160 may be accessible through a remote storage server (not shown), which can be configured to host one or more remote storage devices thereon.

The processing circuitry 110 and/or the memory 120 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Typically each core accesses a storage through a queue pair (QP) and a completion queue (CQ), which is uniquely established between the core 110-1 and the storage device 130-1. However, it may be beneficial to reduce computational, and in case of a networked storage device, network bandwidth consumption, by consolidating multiple QPs and CQs into a shared QP and a shared CQ.

Figure 2:
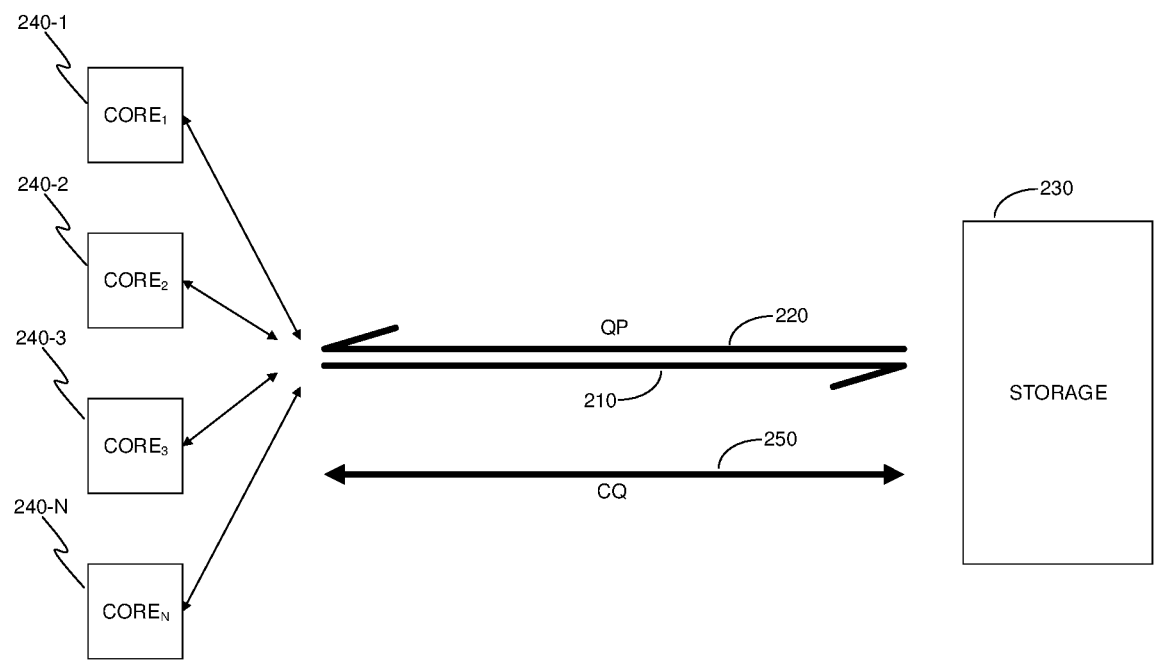
FIG. 2 is a schematic illustration of a plurality of processor cores utilizing a shared queue pair for accessing a storage according to an embodiment.

FIG. 2 is a schematic illustration of a plurality of processor cores 240-1 to 240-N, where N is an integer equal to or greater than 1, utilizing a shared queue pair and completion queue for accessing a storage according to an embodiment. The QP includes a send queue 210 and a receive queue 220. The send queue 210 is for transmitting instructions from the cores to the storage device 230, and the receive queue 220 is for receiving responses from the storage to the cores based on the transmitted instructions. A completion queue 250 may be generated for receiving indications that a request has been completed and that responses have been received.

In one embodiment, the QP is shared by a plurality of cores 240-1 through 240-N. In some embodiments, a shared QP may be established for each storage device. In certain embodiments, a first group of cores may share a first QP, and a second group of cores may share a second QP, where each QP directed at a different storage.

In the shown embodiment, a first core 240-1 initiates an instruction for the storage device 230. The instruction may include a payload, such as a write instruction for having one or more data blocks written to the storage device 230. The instruction may further include an interrupt destination. The interrupt destination is in a memory space assigned to the first core 240-1. Typically, memory spaces should not overlap. The interrupt destination indicates to the storage device 230 to return a response that will generate an interrupt to the first core 240-1 to a specific location in the memory assigned to the first core. By sending the interrupt to the interrupt destination, the cores are able to distinguish which interrupt sent from the storage device is designated to the appropriate core. This eliminates the need for each core to have a dedicated QP and CQ initiated between itself and the storage device 230.

In certain embodiments the storage device 230 may be a local storage device, in other embodiments it may be a remote storage device, and in yet others a combination of local storage devices and remote storage devices may be utilized. For example, when using a remote storage device, either the core or the NIC may determine a memory space associated with the core, and generate an instruction for the send queue 210 specifying that an interrupt should be written to the associated memory space. In certain embodiments, the CQ is optional, and the interrupt is a sufficient indication for completion.

Figure 3:
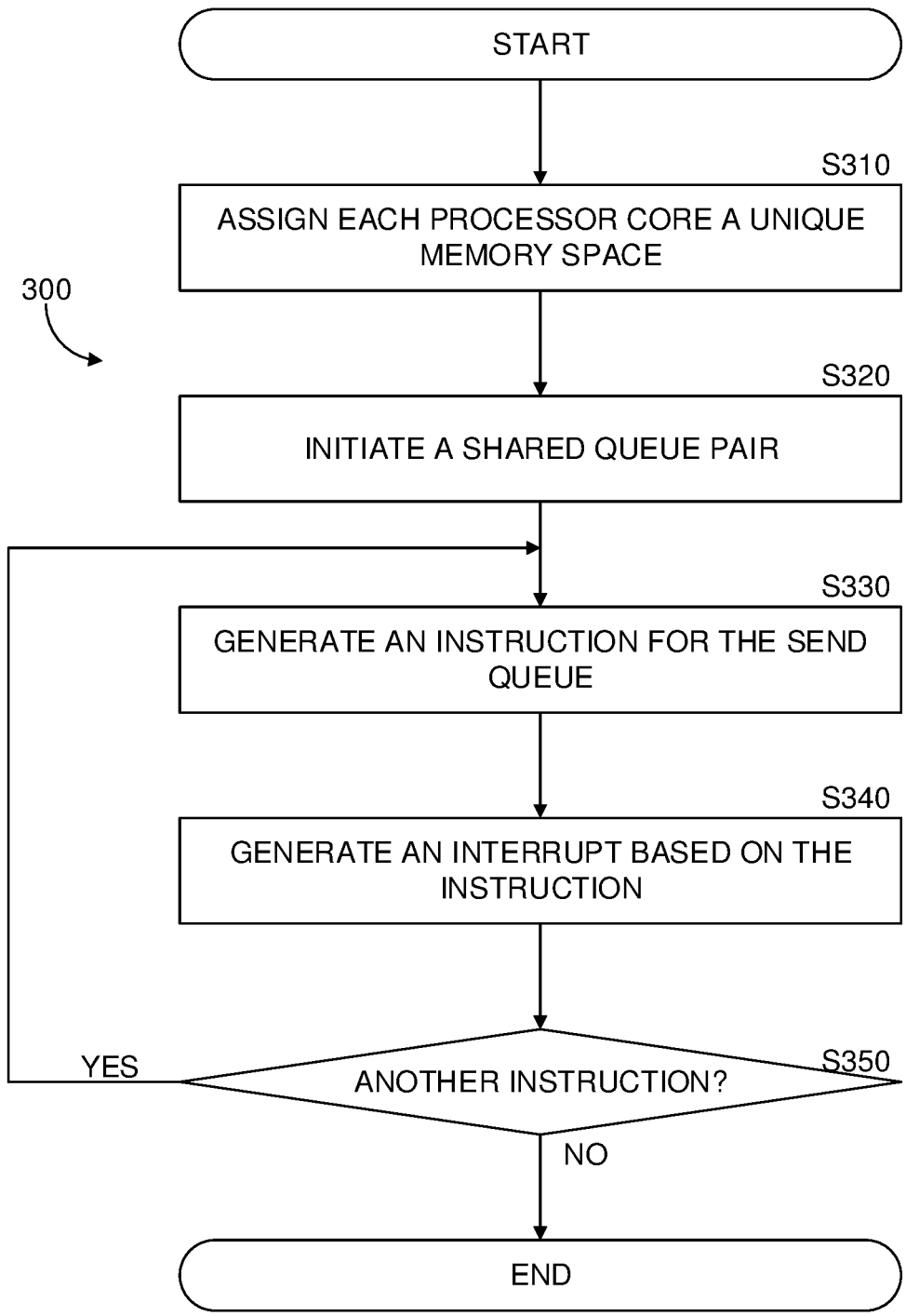
FIG. 3 is a flowchart of a computerized method for improved multi core access to storage devices according to an embodiment.

FIG. 3 is an example flowchart 300 of a computerized method for improved multi core access to storage devices, implemented in accordance with an embodiment.

At S310, a plurality of processor cores in a multi-core client device are each assigned a memory space in the client device. In some embodiments, the memory space may be assigned dynamically. Assignment of memory space may be limited to a time window. For example, a memory space may be mapped to a remote direct memory access (RDMA) key, corresponding to a message signaled interrupts, e.g., MSI-X, address for the interrupt of a specific core. MSI-X is a protocol for in-band signaling of an interrupt, implemented according to PCI protocols.

At S320, a shared queue pair (QP) and completion queue (CQ) is initiated between a first group of the plurality of cores and a remote storage device. In some embodiments, the remote storage can be a virtual volume, which includes multiple physical remote storage devices. The virtual volume may also include one or more local storage devices and one or more remote storage devices. In such embodiments, a shared QP may be initiated between the plurality of cores and each storage device, or between any combination of the plurality of cores and any combination of storage devices. The shared QP allows the first group to share a bandwidth resource between the first group of cores and the storage device. By utilizing less QPs than one per core, the total latency is reduced and computational overhead may also decrease, as for instance, QP and CQ caching typically improves. A QP includes a send queue and a receive queue, as discussed in more detail above.

At S330, a first core generates an instruction for the storage device in the send queue. The instruction includes a data block address, and an interrupt destination. The interrupt destination is in a memory space associated with the first core. In this way, interrupts for a plurality of cores may be sent on a single queue pair, as the mapping of each core to a unique memory space into which the relevant memory address is written into to generate an interrupt to a specific core is what allows differentiation of the interrupts. Thus, each core receives the relevant interrupt notification. The instruction may be, for example, a 'write' instruction, which includes one or more blocks of data corresponding to the address to which the data should be written to. As another example, the instruction may be a 'read' instruction, including an address from which to read a data block, and in some embodiments, a memory address into which the data block should be read to.

At S340, an interrupt is generated and sent to the client device using an RDMA write. At S350, a check is performed to determine if additional instructions should be executed. If so, execution continues at S330, otherwise execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for improving multi-core processor access to storages, the method comprising:
    assigning a unique memory space within a memory to each of a plurality of processor cores;
    initiating a shared queue pair (QP) between the plurality of processor cores and at least a storage, the shared QP comprising a shared send queue and a shared receive queue, wherein the shared QP is accessible by the plurality of processor cores;
    sending an instruction on the shared send queue from a first core of the plurality of processor cores to the storage, the instruction comprising an interrupt destination on a memory space assigned to the first core; and receiving an interrupt at the interrupt destination from the storage in response to the instruction, wherein the interrupt is generated for the first core.

2. The method of claim 1, wherein the storage is any of a local storage and a remote storage.

3. The method of claim 2, wherein the storage is a network storage accessible over a remote direct memory access (RDMA) network.

4. The method of claim 3, wherein the shared QP is established between a network interface controller (NIC) connected to the network storage and the plurality of cores, the shared QP comprising the shared send queue and the shared receive queue.

5. The method of claim 1, wherein the shared QP is a first QP, wherein the first QP is established between a first group of processing cores from among the plurality of processor cores and a first group of storages, wherein a second QP is established for a second group of processing cores from among the plurality of cores and a second group of storages.

6. The method of claim 1, further comprising:
establishing a shared completion queue (CQ) between the plurality of cores and the storage, wherein the shared CQ is configured to send and receive indications that a request has been completed and that responses to the request have been received.

7. The method of claim 1, wherein the instruction is any of a write instruction and a read instruction.

8. The method of claim 1, wherein the interrupt destination further includes a data block address within the memory space assigned to the first core.

9. The method of claim 1, wherein each unique memory space is assigned to one of the plurality of processor cores dynamically.

10. A non-transitory computer readable medium having stored thereon instructions for causing a processing circuitry to perform a process, the process comprising:
assigning a unique memory space within a memory to each of a plurality of processor cores;
initiating a shared queue pair (QP) between the plurality of processor cores and at least a storage, the shared QP comprising a shared send queue and a shared receive queue, wherein the shared QP is accessible by the plurality of processor cores;
sending an instruction on the shared send queue from a first core of the plurality of processor cores to the storage, the instruction comprising an interrupt destination on a memory space assigned to the first core; and
receiving an interrupt at the interrupt destination from the storage in response to the instruction, wherein the interrupt is generated for the first core.

11. A system for improving multi-core processor access to storages, comprising:
a processing circuitry; and
a memory, the memory containing instructions that, when executed by the processing circuitry, configure the system to:
assign a unique memory space within a memory to each of a plurality of processor cores;
initiate a shared queue pair (QP) between the plurality of processor cores and at least a storage, the shared QP comprising a shared send queue and a shared receive queue, wherein the shared QP is accessible by the plurality of processor cores;
send an instruction on the shared send queue from a first core of the plurality of processor cores to the storage, the instruction comprising an interrupt destination on a memory space assigned to the first core; and
receive an interrupt at the interrupt destination from the storage in response to the instruction, wherein the interrupt is generated for the first core.

12. The system of claim 11, wherein the storage is any of a local storage and a remote storage.

13. The system of claim 12, wherein the storage is a network storage accessible over a remote direct memory access (RDMA) network.

14. The system of claim 13, wherein the shared QP is established between a network interface controller (NIC) connected to the network storage and the plurality of cores, the shared QP comprising the shared send queue and the shared receive queue.

15. The system of claim 11, wherein the shared QP is a first QP, wherein the first QP is established between a first group of processing cores from among the plurality of processor cores and a first group of storages, wherein a second QP is established for a second group of processing cores from among the plurality of cores and a second group of storages.

16. The system of claim 11, wherein the system if further configured to:
establish a shared completion queue (CQ) between the plurality of cores and the storage, wherein the shared CQ is configured to send and receive indications that a request has been completed and that responses to the request have been received.

17. The system of claim 11, wherein the instruction is any of a write instruction and a read instruction.

18. The system of claim 11, wherein the interrupt destination further includes a data block address within the memory space assigned to the first core.

19. The system of claim 11, wherein each unique memory space is assigned to one of the plurality of processor cores dynamically.

* * * * *